(12) United States Patent
Minowa

(10) Patent No.: US 7,644,043 B2
(45) Date of Patent: Jan. 5, 2010

(54) CHECK PROCESSING APPARATUS, PROGRAM, ELECTRONIC PAYMENT SYSTEM, AND CHECK PROCESSING METHOD

(75) Inventor: Masahiro Minowa, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 815 days.

(21) Appl. No.: 10/911,431

(22) Filed: Aug. 4, 2004

(65) Prior Publication Data

US 2005/0033695 A1 Feb. 10, 2005

(30) Foreign Application Priority Data

Aug. 7, 2003 (JP) .............................. 2003-289086

(51) Int. Cl.
*G06Q 40/00* (2006.01)
(52) U.S. Cl. .............................. 705/45; 705/35; 382/137
(58) Field of Classification Search .................. 705/45, 705/35, 36 R, 10, 14; 382/135, 137–140; 235/476, 379–380
See application file for complete search history.

(56) References Cited

U.S. PATENT DOCUMENTS

| | | | | |
|---|---|---|---|---|
| 4,590,606 | A * | 5/1986 | Rohrer | 382/137 |
| 5,581,630 | A * | 12/1996 | Bonneau, Jr. | 382/116 |
| 5,657,389 | A | 8/1997 | Houvener | |
| 5,790,674 | A | 8/1998 | Houvener et al. | |
| 5,832,464 | A | 11/1998 | Houvener et al. | |
| 5,940,844 | A * | 8/1999 | Cahill et al. | 715/268 |
| 6,038,553 | A * | 3/2000 | Hyde, Jr. | 705/45 |
| 6,040,783 | A | 3/2000 | Houvener et al. | |
| 6,070,141 | A | 5/2000 | Houvener et al. | |
| 6,181,837 | B1 * | 1/2001 | Cahill et al. | 382/305 |
| 6,202,055 | B1 | 3/2001 | Houvener et al. | |
| 6,282,308 | B1 * | 8/2001 | Cossette | 382/137 |
| 6,389,151 | B1 * | 5/2002 | Carr et al. | 382/100 |
| 6,397,194 | B1 | 5/2002 | Houvener et al. | |
| 6,424,249 | B1 * | 7/2002 | Houvener | 340/5.82 |
| 6,450,403 | B1 * | 9/2002 | Martens et al. | 235/379 |
| 6,574,377 | B1 * | 6/2003 | Cahill et al. | 382/305 |
| 6,647,136 | B2 * | 11/2003 | Jones et al. | 382/137 |
| 6,654,487 | B1 * | 11/2003 | Downs, Jr. | 382/139 |
| 7,000,828 | B2 * | 2/2006 | Jones | 235/379 |
| 7,177,840 | B2 * | 2/2007 | Maloney | 705/45 |

(Continued)

FOREIGN PATENT DOCUMENTS

JP 11-509015 8/1999

(Continued)

OTHER PUBLICATIONS

Point-of-sale fraud fighter, Nov. 1, 2002, ABA Bank Marketing, 2002 (FraudFighter).*

(Continued)

*Primary Examiner*—James P Trammell
*Assistant Examiner*—Chika Ojiaku
(74) *Attorney, Agent, or Firm*—Rosalio Haro

(57) ABSTRACT

A check processing apparatus and method acquire and save data verifying the identity of a person using a check, and output this information in an effective manner to prevent improper use of the check. A check scanner 140 images all or part of the presented check C. A photo ID scanner 110 scans personal identification 71 presented as proof of identity by the person using the check, and a controller 160 converts the scanner output to generate personal identification image data. A merge file generating means 170 merges the image data from the check scanner with the personal identification image data to produce a merged file. The merged file is stored in merged file storage means 180 and output to a display 33.

28 Claims, 11 Drawing Sheets

U.S. PATENT DOCUMENTS

2002/0138351 A1    9/2002    Houvener et al.

FOREIGN PATENT DOCUMENTS

JP    2003-6551    1/2003

OTHER PUBLICATIONS

Tech Advancement Allows Customers to See Images of Checks Instantly; Bank of America Implementation Is Largest in the Country, PR Newswire, Nov. 27, 2002 p. 1 (ChkImage).*

* cited by examiner

CHECK PROCESSING APPARATUS, PROGRAM, ELECTRONIC PAYMENT SYSTEM, AND CHECK PROCESSING METHOD

BACKGROUND OF THE INVENTION

1. Field of the Invention

The present invention relates to a check processing apparatus and program for processing payments by check, to an electronic payment system, and to a check processing method.

2. Description of the Related Art

Payment systems using checks C such as business checks C1 shown in FIG. 4A and personal checks C2 shown in FIG. 4B are common throughout the United States. More recently, electronic payment systems that scan checks C and communicate the captured image data over a network for electronic processing have been introduced. These electronic payment systems quickly and safely complete the payment process.

As shown in FIG. 11, such an electronic payment system 201 involves a user 211 that presents a check C for payment, a store (POS terminal) 212 where the check C is used, the issuing bank 213 where the account on which the check C is drawn is held, the vendor's bank 214 where the store 212 does its banking, and a payment processing server 215 for processing check C payments. The payment processing server 215 is connected over a network 220 to the user 211, store (POS terminal) 212, check-issuing bank 213, and the vendor's bank 214.

When making a payment, the user 211 presents a check C to the store. If the check C is a personal check such as shown in FIG. 4B, check tracking information 92 (an MICR code containing information identifying the user, issuing bank, and account) uniquely identifying the check C is preprinted in magnetic ink on the front (face) of the check C. This information can be read using a magnetic head (MICR: magnetic ink character reader), and using this information the store can readily verify the validity of check C. To verify the validity of check C, the store sends the check information to the payment processing server 215. The payment processing server 215 determines if the check C is valid, and returns the result to the store.

If the validity of check C is confirmed, the operator (checkout clerk) prints the check amount 95, 98 and store information (payee) 94 on the check face, and endorsement information 99 on the check back (see FIG. 4 and FIG. 5), and has the user 211 sign the check C on the signature line 96. The store then scans and captures an image of the face of the completed check using a check scanner, stores the resulting image data together with the tracking information 92 read by MICR, the check amount 95, 98, and store information (payee) 94 in the POS terminal computer, and sends the same information to the payment processing server 215.

Based on the received image data, tracking information 92, check amount 95, 98, and store information (payee) 94, the payment processing server 215 executes a transaction process between the vendor bank 214 and check-issuing bank 213. The payment processing server 215 also reports to the user 211 that the image data was transmitted and the payment processed. By thus transmitting an electronic image of the check C, the electronic payment system 201 eliminates the need to further handle the physical check, and thus quickly and safely completes the payment process.

Check payment systems, including electronic payment systems 201 such as described above, have been beset by growing damages from check forgery and improper check usage, including theft and checks returned for insufficient funds. In the United States alone such damages reach $1 billion a year, and approximately one-million bad checks are found within the check payment system every day.

To help reduce such losses, retail stores commonly require the check user to present such identification as a driver license or other photo ID to (1) confirm a match between the user's name and the name on the check, and (2) confirm a match between the user and the ID photograph on the driver license or other presented identification. This method cannot, however, detect unauthorized usage if the presented identification is forged, for example, and leaves no evidence or proof that the identification was forged.

To solve this problem, payment systems that store the driver license number in addition to check image and other payment information are also available. See, for example, Japanese Unexamined Patent Appl. Pub. 2003-6551. Some stores also routinely record the driver license number on the check C. Unfortunately, errors occur either writing the driver license number on the check or entering the driver license number into the POS terminal, and this data is therefore also considered insufficient as evidence.

To solve this problem, Image Data LLC in the United States proposed an identity verification system for verifying an individual's identity using a database of personal identification information including facial photographs and personal information based on a credit card or check C presented by a user. See, for example, PCT/US96/06425.

The problem with the foregoing system, however, is that a nationwide database containing personal information for an unknowable number of individuals throughout the United States, and the infrastructure enabling identity verification on-line, are unavailable, and this system is therefore not expected to have widespread effect.

OBJECT OF THE INVENTION

An object of the present invention is therefore to provide a check processing apparatus for acquiring and effectively outputting personal identification information for verifying the identity of an individual using a check in order to prevent illicit check usage. A further object of the invention is to provide a program for this check processing apparatus, an electronic payment system, and a check processing method.

SUMMARY OF THE INVENTION

To achieve the foregoing object, a check processing apparatus for processing payments by check includes a check image scanning unit for imaging all or part of a check; an identity verification information acquisition unit for capturing identity verification information used to identify an individual using the check; an identity verification data generating unit for generating identity verification data as an image of the captured identity verification information; a merge file generating unit for merging the image data captured by the check image scanning unit and the identity verification data to generate a merged file; a merged file storage unit for storing the merged file; and a merged file output unit for outputting the merged file.

In addition, a check processing method according to the present invention includes a check image scanning step for imaging all or part of a check presented by a person using the check; an identity verification information acquisition step for capturing identity verification information used to identify an individual using the check; an identity verification data generating step for generating identity verification data as an image of the captured identity verification information; a merge file generating step for merging the image data captured by the check image scanning step and the identity verification data to generate a merged file; and a merged file output step for outputting the merged file.

A record that can be used as proof of a crime when a check is used illicitly or illegally (such as check forgery) is thus created and saved because identity verification data verifying the identity of the person using the check is acquired and saved. If the identity verification data is generated from a driver license, for example, the person presenting a check for payment is required to also present her driver license. A person trying to use the check illegally is therefore forced in this situation to also use a forged or stolen driver license, but because proof of the crime (that is, an image acquired by scanning the driver license) is saved even in such scenarios, the information can be used to help identify the criminal.

Furthermore, because the identity verification data captured as an image of the personal identification information (driver license in this case) and the check image are not stored separately or in linked files or records, but are instead stored (output) as a single merged file, the operator can quickly and easily verify the check image data and the identity verification data.

In addition, because information for relating the image data and identity verification data is not needed, the data structure is simplified and the required data storage space is minimized.

Preferably, the check image scanning unit scans and images both sides of the check; and the merge file generating unit generates the merged file by merging image data for both sides of the check with the identity verification data.

Likewise, the check image scanning step scans and images both sides of the check; and the merge file generating step merges the image data for both sides of the check with the identity verification data.

This implementation creates the merged file by merging image data from both sides of the check with the identity verification data, and thus creates a more detailed, accurate image data record of the information.

Furthermore, if an error was made on either side of the check, the merged file can be easily retrieved later for reference.

Yet further preferably, the merge file generating unit has a first merge file generating unit for producing a first merged file by merging the identity verification data with a complete image of either the front or back of the check, and a second merge file generating unit for producing a second merged file by merging the first merged file with a complete image of the other side of the check. The merged file storage unit then stores the second merged file.

Likewise, the merge file generating step includes a first merge file generating step for producing a first merged file by merging the identity verification data with image data for a complete image of either the front or back of the check, and a second merge file generating step for producing a second merged file by merging the first merged file with the image data for a complete image of the other side of the check after the first merged file generating step.

As thus described, a complete image of one side of the check and personal identification image data are first merged to create a first merged file, and this first merged file is then merged with the complete image of the other side of the check to produce the second merged file. Therefore, when the check is scanned and the personal identification information is acquired at the same time in parallel operations (using a separate scanner to image the personal identification information if the personal identification information is captured by scanning), the first merged file is created when one side (either the front or back) of the check is scanned, the second merged file is created when the other side of the check is scanned, and the merged file can be generated quickly. More specifically, generating the merged file does not need to wait for imaging both sides of the check.

The merging process is also simplified because two check images (image data for the check front and back), and the personal identification information (that is, a total of three units of information) are not merged at the same time.

Further preferably, the first merge file generating unit produces the first merged file by pasting the identity verification data into an area outside the endorsement printing area in the image data for the back of the check.

Likewise, the first merge file generating step produces the first merged file by pasting the identity verification data into an area outside the endorsement printing area in the image data for the back of the check.

By thus pasting the identity verification data into an area outside the endorsement printing area in the image data for the back of the check to generate the first merged file, the readability of the endorsement is not impaired. Furthermore, because the image size of the first merged file and the image of the other side of the check are the same size, the images are easier to merge, and the output second merged file is easier to read and use.

Yet further preferably, the merged file output unit displays the second merged file on a display so that the entire second merged file is viewable on the display at one time without the operator needing to scroll or move the displayed content.

Likewise, the merged file output step displays the second merged file so that the entire image is viewable at one time by the operator on the display.

By thus displaying the second merged file so that the entire image can be seen on screen at one time and the operator does not need to scroll the image to view the file, the operator can immediately verify the images for both sides of the check and the identity verification data.

Yet further preferably, this check processing apparatus also has a check identification information reader for reading check identification information that identifies a check and is preprinted in magnetic ink on the check; a check type detection unit for determining if the check is a personal check drawn on an account owned by the check user based on the read check identification information; and an identity verification data acquisition detection unit for determining, when the check is determined to be a personal check, if identity verification data for the check user was acquired in the past. If the identity verification data acquisition detection unit determines that identity verification data for the check user was acquired in the past, the merged file output unit outputs the previously acquired merged file.

Likewise, the check processing method preferably has a check identification information reading step for reading check identification information that identifies a check and is preprinted in magnetic ink on the check; a check type detection step for determining if the check is a personal check drawn on an account owned by the check user based on the read check identification information; and an identity verification data acquisition detection step for determining, when the check is determined to be a personal check, if identity verification data for the check user was acquired in the past. If identity verification data for the check user is determined to have been acquired and stored in the past, the merged file output step outputs the previously acquired merged file.

The check user can be identified from such information as the bank account number that is contained in the check identification information (MICR code) when the check is a personal check. Therefore, if the same user uses another check at a later time at the same check processing apparatus (the same POS system if multiple check processing apparatuses are used connected to and centrally controlled by a POS server), the previously stored merged file can be output (displayed on screen or printed, for example). If the identity verification data was a driver license, for example, the operator can compare the picture of the previous user on screen with the face of the current check user to determine if they are the same person.

Furthermore, if a fingerprint of the thumb, for example, is acquired as the identity verification data instead of a driver license, the operator could visually compare the new fingerprint of the check user with the stored fingerprint, and if the prints are clearly different, the operator could decide that a crime is likely and refuse the check. Illegal check usage can thus be prevented more reliably.

Yet further preferably, this check processing apparatus also has a specific information detection unit for determining if specific information is contained in the check identification information; a payment amount evaluation unit for determining if the payment amount of the check is greater than or equal to a specified amount; and an identity verification data acquisition control unit for determining whether to acquire identity verification data according to the decision made by the specific information detection unit and/or the payment amount evaluation unit. The identity verification information acquisition unit captures identity verification information based on the decision of the identity verification data acquisition control unit.

Likewise, the check processing method of this invention also preferably has a specific information detection step for determining if specific information is contained in the check identification information; a payment amount evaluation step for determining if the payment amount of the check is greater than or equal to a specified amount; and an identity verification data acquisition control step for determining whether to acquire identity verification data according to the decision made by the specific information detection step and/or the payment amount evaluation step. The identity verification information acquisition step captures identity verification information based on the decision of the identity verification data acquisition control step.

Rather than acquiring identity verification data for all users, this configuration enables selectively scanning personal identification based on the check identification information and payment amount, for example. By thus imaging identification (identity verification data) only when the check could result in a large loss (such as with business checks used to pay salaries), or the check amount is large, evidence relating to high risk checks can be efficiently collected and saved without lowering overall job efficiency.

The identity verification information is preferably personal identification of the user or information items recorded on said personal identification.

Furthermore, users can be identified using various forms of identification, including a driver license, passport, ID cards, and even ATM cards. The identity verification data could also be acquired by reading (using character recognition) specific information recorded on the personal identification.

The identity verification data is further not limited to personal identification, and biometric data could be used.

Various types of biometric data could be collected, including a fingerprint, a hand print (length and thickness of the fingers, size of the hand itself), a retina scan (pattern of blood vessels in the eye), an iris scan, a facial photograph, blood vessel pattern (vein pattern), a voice print, a dynamic signature (the shape and time pattern for writing a signature), or a keystroke pattern (key entry timing).

A program according to the present invention is a computer-readable program for achieving the means of any check processing apparatus described above.

To prevent illicit check usage, this program can drive a check processing apparatus to acquire information verifying the identity of the person using a check, and output this information in an effective manner.

An electronic payment system according to the present invention includes any check processing apparatus described above, and a payment processing server connected to the check processing apparatus through a network for determining check validity. The payment processing server determines check validity based on the merged file sent from the check processing apparatus.

An electronic payment system generally determines check validity based on check identification information. The electronic payment system of this invention affords determining check validity more accurately because the decision is based on a merged file containing identity verification data (preferably including information acquired by character recognition of check identification information (MICR code) preprinted on the front of the check). For the payment processing server to thus determine check validity based on merged file content, identity verification data must have been previously provided by numerous users. Therefore, if a fingerprint is used as the identity verification data, everyone in the country (or everyone using a check) must be required to provide a fingerprint, and verification is preferably done by computer rather than visually at the payment processing server. Check validity can thus be determined based on an objective constant standard, and reliability can be improved.

A check processing apparatus, program, electronic payment system, and check processing method according to the present invention acquire personal identification information verifying the identity of the person using a check from that person, and this information can thus be used as a record of a crime in the event the check was used illegally (such as check forgery).

Furthermore, by merging identity verification data, which is an image of the personal identification information, with scanned images of the check into a single merged file that is stored and output, the operator can quickly and easily verify the check image data and identity verification data.

In addition, because data linking the image data and the identity verification data is not needed, the data structure is simplified and less data storage space is needed.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Preferred embodiments of the present invention are described below with reference to the accompanying figures.

This invention captures information from personal identification presented by a check user as proof of identity, and creates a record of this information. This record can later be used as criminal evidence in the event the check is used illegally (including check forgery).

Furthermore, rather than storing the identity verification data acquired by imaging the presented identification and the check image data separately or in related files or records, this information is merged to a single merge file for storage and output. The operator can therefore easily and quickly confirm the image data and the identity verification data.

In addition, because data for linking the image data and identity verification data is not needed, the data structure is simplified and the amount of data stored is minimized.

The invention is described below with reference to a check processing apparatus (a hybrid processing apparatus having the functions of a personal identification scanner, check reader, magnetic reader, check printer, and receipt printer) used in a POS terminal in a restaurant, retail store, or other commercial establishment. In addition, personal identification such as a driver license is used by way of example as the identity verification data that is captured. A POS system and electronic payment system using this POS terminal are also described.

Figure 1:
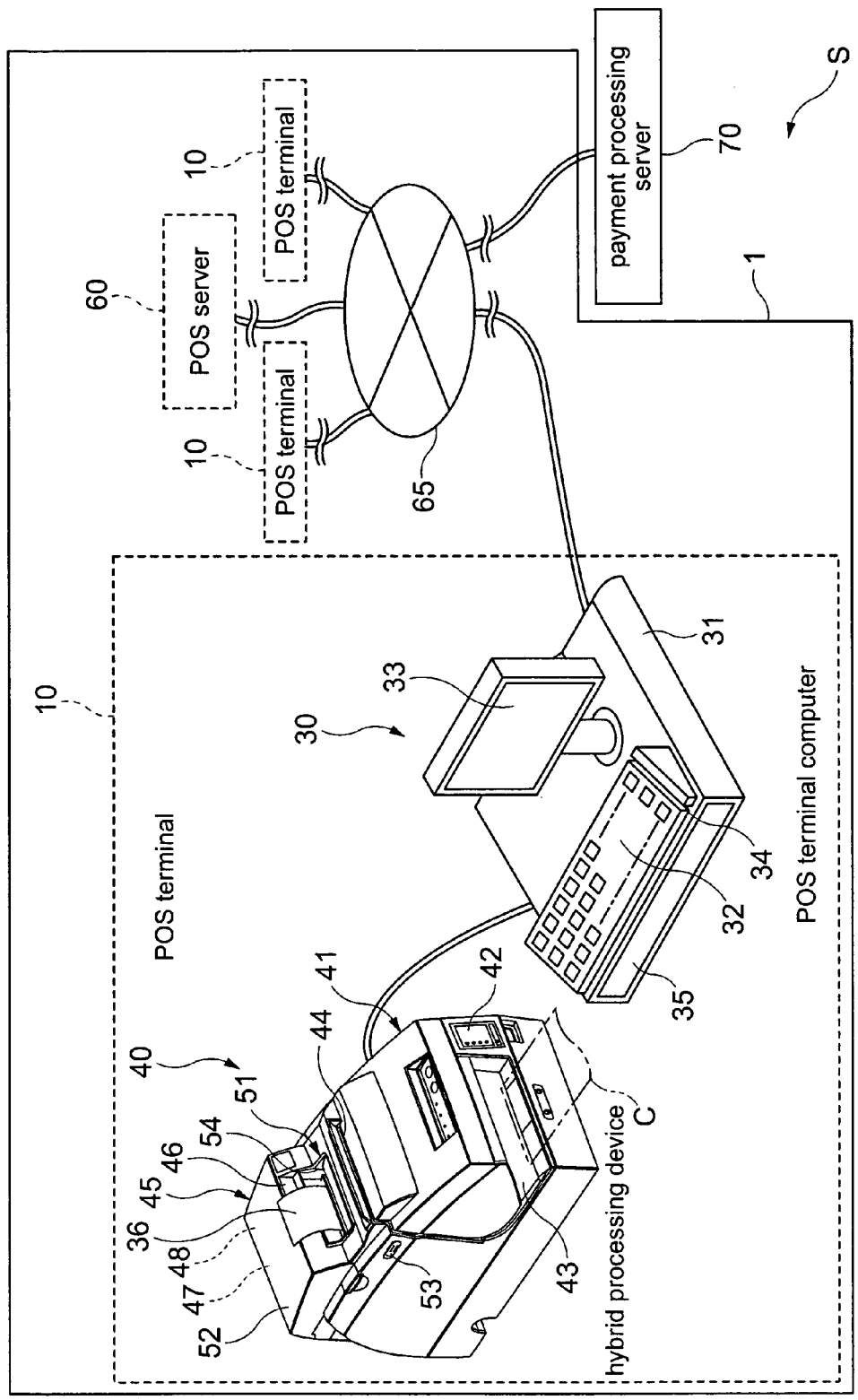
FIG. 1 is a schematic diagram of a POS system according to a preferred embodiment of the present invention.
Figure 2:
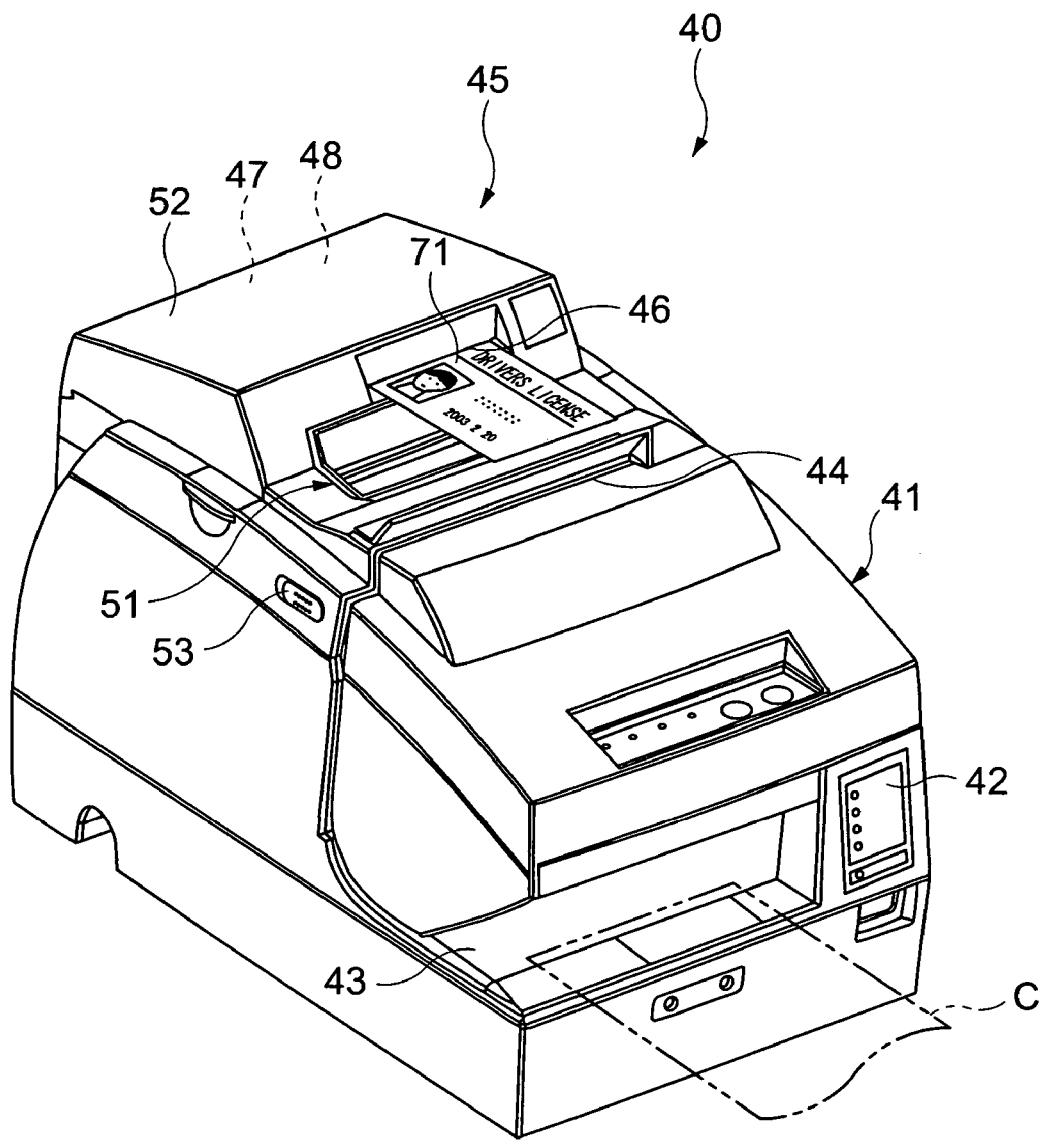
FIG. 2 is an external view of a hybrid processing device having the function of a check processing apparatus according to a preferred embodiment of the present invention.

As shown in FIG. 1 and FIG. 2, a POS terminal 10 according to the present invention includes a POS terminal computer 30 and a hybrid processing device (multifunction device) 40. Product information is entered by an operator to the POS terminal computer 30, which calculates the payment amount. The hybrid processing device 40 executes various check C processing operations.

The POS terminal computer 30 includes a main case 31, a keyboard 32 for entering product codes, price information, and other product information, a display 33 for displaying the entered product information, price information, and the merged file f generated by the hybrid processing device 40, a magnetic stripe reader (MSR) 34 for reading credit cards 76 (see FIG. 6), and a cash drawer 35 for holding cash. The POS terminal computer 30 is connected to a POS server 60 over a network 65.

The POS server 60 is connected to a plurality of POS terminals 10 (only three shown in FIG. 1), and centrally manages and processes product information and inventory information from the POS terminals 10. More specifically, the POS server 60 acquires product information entered to a POS terminal 10, and retrieves product name and price information from the price list (PLU list) stored in the POS server 60. From the retrieved information, the POS server 60 then generates product data to be printed on a receipt 36 described below or displayed on the display 33, and sends this data to the POS terminal 10. Based on the product data sent from the POS server 60, the POS terminal 10 generates print data for printing on the receipt 36, and sends this data to the hybrid processing device 40 while also generating display data for presentation on the display 33.

The hybrid processing device 40 is connected to the POS terminal computer 30 through a connector not shown, and has a plastic outside cover 41. An insertion slot 43 for manually inserting a check C substantially horizontally is formed at the front of the hybrid processing device 40, and a paper exit 44 for discharging the inserted check C is formed in the top. An opening/closing maintenance cover 52 is rendered at the top back portion of the outside cover 41. When a sliding lock button 53 located at a side top portion of the outside cover 41 is operated, the maintenance cover 52 can pivot open around the back end thereof. An indicator unit 42 is rendered at the front side of the hybrid processing device 40 for displaying errors and other directions (such as personal identification 71 scanning instructions). These errors and directions can be displayed on the display 33, in which case the indicator unit 42 is unnecessary.

As noted above, this hybrid processing device 40 has the function of a personal identification reader ("photo ID scanner" 110 below, FIG. 6), and images personal identification 71 using the photo ID scanner unit 45 disposed at the back top portion of the hybrid processing device 40.

The photo ID scanner unit 45 includes an ID scanner 47 for imaging the personal identification 71, and an ID transportation mechanism 48 for conveying the personal identification 71 inserted from the insertion/discharge slot 46 to the ID scanner 47, and then returning the personal identification 71 to the insertion/discharge slot 46.

While a driver license is used and imaged as the personal identification 71 in the present embodiment, other forms of identification could be used, including a passport, health insurance card, student ID, or other type of ID card identifying an individual. For greater reliability, however, the personal identification 71 preferably contains a photograph of the individual.

Furthermore, a common card scanner can be used for this photo ID scanner unit 45, and detailed description thereof is thus omitted below.

Figure 6:
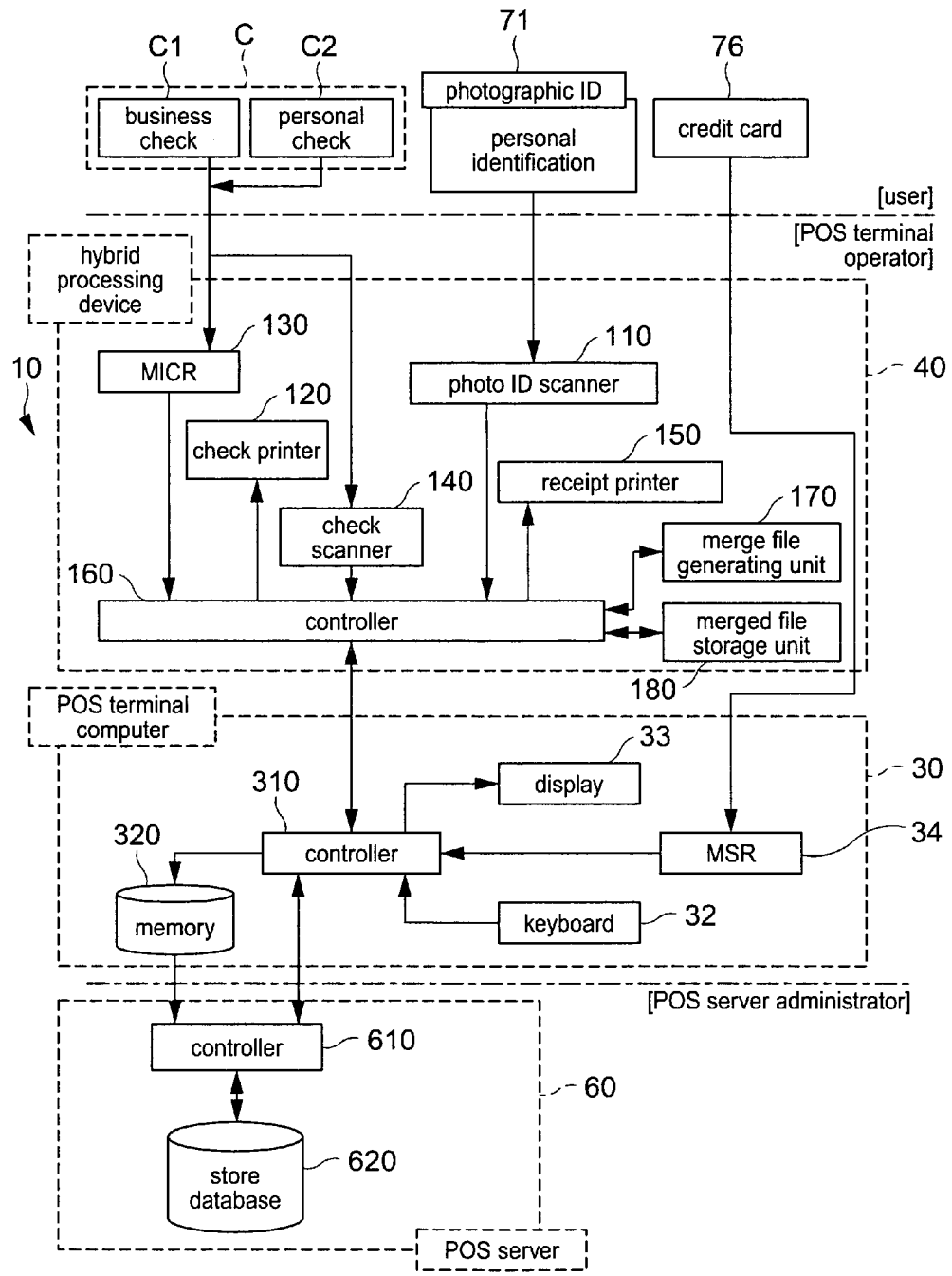
FIG. 6 is a control block diagram of a POS system according to the present invention.

As shown in FIG. 6, the hybrid processing device 40 also has the function of a check scanning device (check scanner) 140, magnetic reading device (MICR) 130, and check printing device (check printer) 120 for executing a variety of check-related processes in a single device, including imaging checks C, reading check tracking information (MICR code) 82/92 preprinted in magnetic ink on checks C, and printing the check amount information 85/95 on checks C (see FIG. 4). A POS terminal 10 capable of handling the complete sequence of check C processing operations can thus be providing by simply connecting this hybrid processing device 40 to a POS terminal computer 30.

The function of a receipt printer 150 for printing receipts is also rendered in the middle of the hybrid processing device 40. A receipt paper holder (not shown in the figure) for holding a roll of receipt paper, a receipt printing unit 51 for printing receipts 36, and a receipt transportation mechanism (not shown in the figure) for transporting the receipt paper to the receipt printing unit 51 and then discharging the printed receipt 36 from the receipt exit 54 formed in the top of the outside cover 41, are formed to the rear of the receipt printer 150. The configuration of this receipt printing unit 51 is identical to that of a common receipt printer, and further detailed description thereof is thus omitted.

The POS terminal 10 is also connected through a network 65 (such as the Internet) to a payment processing server 70 that verifies the validity of checks C, thus realizing an electronic payment system S. The POS terminal 10 sends the MICR code 82/92 (see FIG. 4) information read by the check scanner 140 to the payment processing server 70, which verifies the validity of the check C. The POS terminal 10 then determines whether a check C is valid or invalid based on the response from the payment processing server 70. If the check is deemed invalid by the payment processing server 70, the check C is judged unusable (and is discharged).

Figure 3:
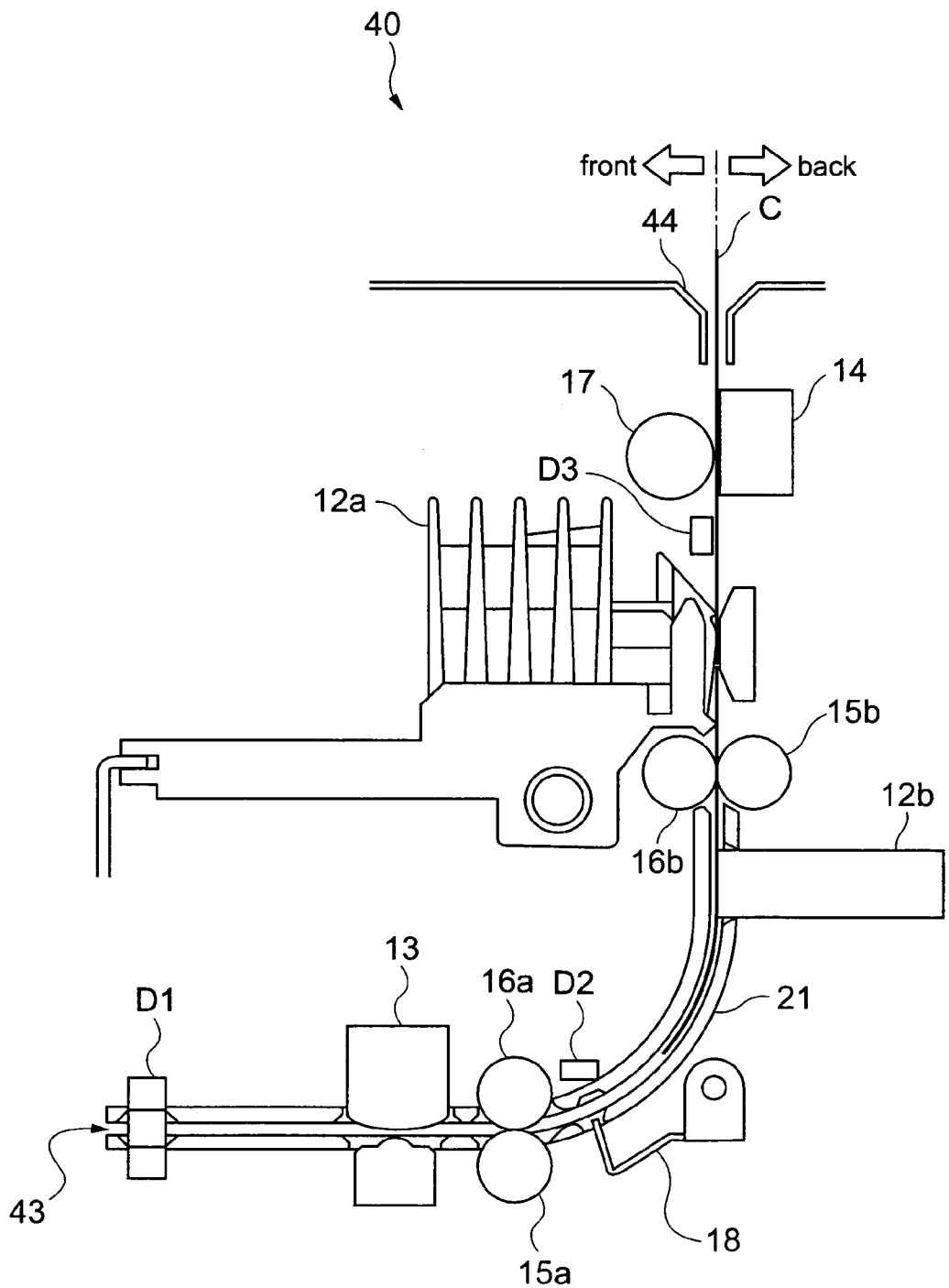
FIG. 3 is a side schematic view of a hybrid processing device having the function of a check processing apparatus according to a preferred embodiment of the present invention.

With reference to FIG. 3, the internal configuration of the hybrid processing device 40 is described next below. FIG. 3 is a schematic side view showing the inside of the hybrid processing device 40. As shown here the hybrid processing device 40 has disposed along the transportation path 21 from the insertion slot 43 side: magnetic head 13 (MICR 130), endorsement print head 12b, front print head 12a (check printer 120), and scanner 14 (check scanner 140). Checks C are conveyed by drive rollers 15a, 15b, driven rollers 16a, 16b, and drive roller 17 opposite the scanner 14. Three sensors D1, D2, D3 for detecting paper presence are also disposed to the transportation path 21. Note that the relative positions of the print heads 12a, 12b, magnetic head 13, and scanner 14 shall not be limited to that shown in FIG. 3, and other configurations are possible.

A form stop 18 for positioning checks C inserted from the insertion slot 43 is placed in the transportation path 21 between the drive roller 15a and endorsement print head 12b. The driven rollers 16a, 16b can be moved by an actuator not shown between an open position separated from the drive rollers 15a, 15b, and a closed position in contact with the drive rollers 15a, 15b. Linked to the opening and closing operation of these rollers, the form stop 18 also moves between a position interceding in the transportation path 21 (closed position) and a position removed from the transportation path 21 (open position).

When rollers 15a, 16a are open, the form stop 18 intercedes in and thus closes the transportation path 21, and a check C can be inserted from the insertion slot 43. When sensors D1, D2 detect that a check C was inserted from the insertion slot 43, the actuator not shown is driven so that the rollers 15a, 16a move to the closed position and the form stop 18 retracts from the transportation path 21 to the open position. The drive roller 15a is then driven to transport the check C, and the MICR code 82, 92 is read by the magnetic head 13. Drive rollers 15b and 17 are then driven to transport the check C for processing by the endorsement print head 12b and scanner 14, and the check C is then discharged from the paper exit 44.

The configuration of a typical check C processed by this hybrid processing device 40 is described next with reference to FIG. 4 and FIG. 5. FIG. 4 shows the face of two different types of checks C, that is, business checks C1 such as shown in FIG. 4A and personal checks C2 such as shown in FIG. 4B.

Business checks, such as payroll checks and voucher checks, and personal checks are basically the same, differing slightly in how they are used and the information contained in the MICR code. Business checks are used to pay salaries and vendors, therefore tend to be for larger amounts than personal checks, and are usually simply deposited to another account in the same or different bank. The potential financial loss from business checks is therefore large compared with personal checks. Payroll checks are a common use of business checks, which also referred to herein as payroll checks.

Personal checks are commonly written at the checkout counter in grocery stores and other retail stores. Personal checks are therefore usually for smaller amounts than business checks, and are signed by the account holder at the point of sale.

Figure 4A:
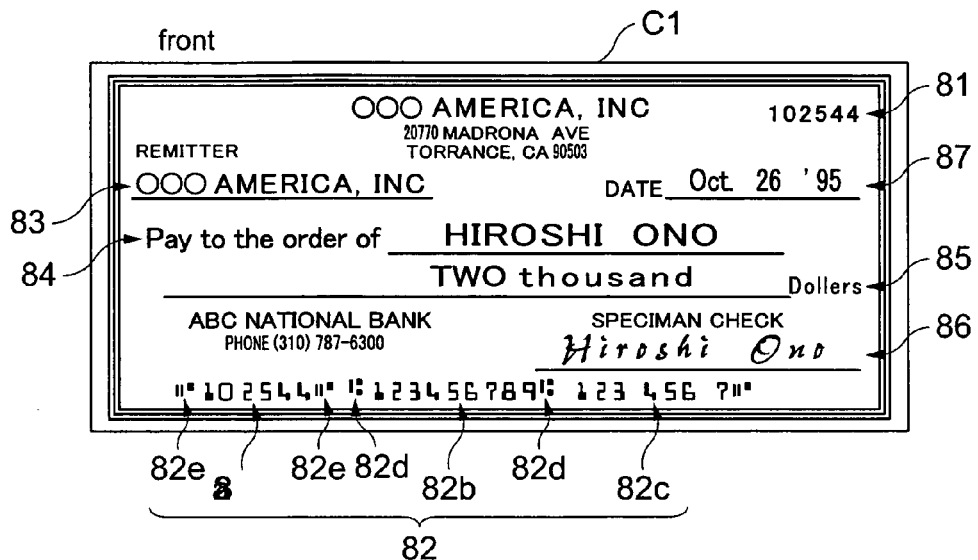
FIGS. 4A and 4B show the front of a business check and a personal check, respectively, as used in a hybrid processing device according to a preferred embodiment of the present invention.
Figure 4B:
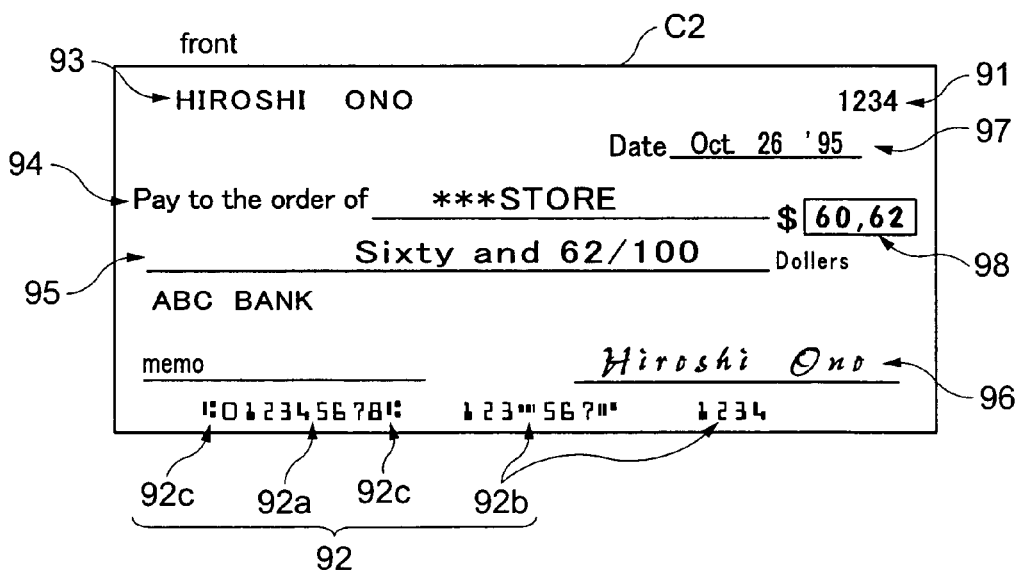

As shown in FIG. 4A, business checks C1 are preprinted with a serial number 81, account holder (user name) 83 information (in this case the name of the remitting corporation), and an MICR code 82 preprinted in magnetic ink for reading by an MICR 130. The payee 84 and payment amount 85 are printed or written on the check C by the user. This embodiment of the invention reads the MICR code 82 to determine the type of check C.

The format of the MICR code 82 on business checks C1 is standardized according to ANSI/ABA X9.13, Specifications for Placement and Location of MICR Printing, for example. In this case, the MICR code 82 includes in order from the left side an Auxiliary On-Us field (check number) 82a, routing field 82b, and On-Us field (account number) 82c.

The routing field 82b is a unique nine digit routing number assigned to each bank by the American Bank Association (ABA). The routing field 82b is demarcated by a standardized transit symbol 82d, also defined by the ABA.

The On-Us field (account number) 82c and Auxiliary On-Us field (check number) 82a are defined by the individual bank, but the On-Us field 82c uniquely identifies the account on which the check is drawn, and the Auxiliary On-Us field 82a contains the user's check serial number 81.

The serial number 81 in the Auxiliary On-Us field 82a is also often demarcated by a unique symbol 82e (called the Onus character) that is different from the transit symbol 82d demarcating the routing field 82b.

While business checks C1 have the Auxiliary On-Us field 82a in which the serial number 81 is printed, this field is not provided on personal checks C2 as described below. The type of check C can therefore be determined by detecting the presence of this Auxiliary On-Us field 82a (the code printed in this field is referred to below as the "leading code").

When a payroll check C1 is cashed, the user endorses the check by signing it in the endorsement area on the back of the check.

As shown in FIG. 4B, personal checks C2 typically have a preprinted serial number 91 and user name 93, and an MICR code (tracking information) 92 preprinted in magnetic ink for reading by the MICR 130. The MICR code 92 is also read by the MICR 130 from personal checks C2, and whether to image personal identification 71 is determined based on information acquired from the MICR code 92.

The format of the MICR code 92 printed on personal checks C2 is also defined according to ANSI/ABA X9.13, and from left contains a routing field 92a and On-Us field (account number) 92b. As in the routing field 82b on business checks C1, this routing field 92a contains the unique nine-digit routing number assigned by the ABA to each bank, and a transit symbol 92c marker. The On-Us field 92b can likewise be formatted as desired by the bank, but typically and in this example contains the user's account number and check serial number. The MICR code 92 thus contains information (including information identifying the bank and account number on which the check is drawn) relating to the bank account of the person using the check C.

When a personal check C2 is used, the user fills in the date 97, payee 94, and check amount 98 and 95, and then signs the check on the signature line 96. This information could also be printed by the POS terminal 10 operator using the check printer 120 so that the user only needs to sign 96 the check.

Figure 5:
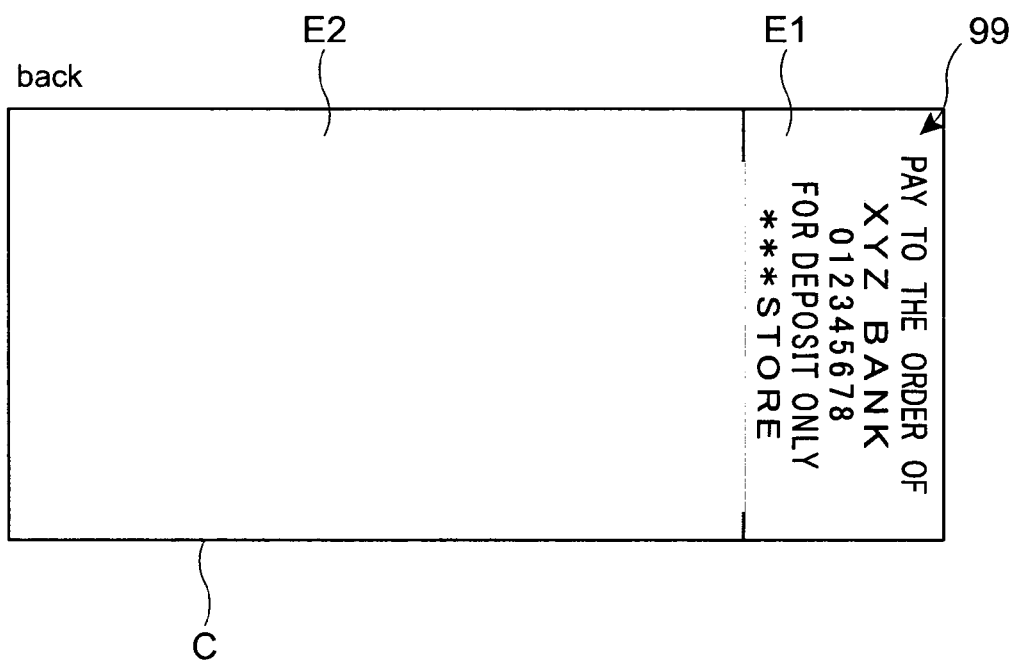
FIG. 5 shows the back of a check used in a hybrid processing device according to a preferred embodiment of the present invention.

As shown in FIG. 5, endorsement information 99 is either handwritten or printed to the back of both business checks C1 and personal checks C2 when the check is used. When the endorsement 99 is printed by a POS terminal, the endorsement information 99 generally includes the store name, account information, the check amount, and the date. This endorsement information 99 is typically written (printed) to a specific part of the check C, and the remaining area E2 is left blank.

The control system of this POS system 1 is described next with reference to the block diagram in FIG. 6. As described above, this POS system 1 includes a plurality of POS terminals 10, and a POS server 60 for centrally controlling and serving the multiple POS terminals 10. Each POS terminal 10 has a hybrid processing device 40 for performing a number of check C processing operations and scanning personal identification 71 (acquiring identity verification data), and a POS terminal computer 30 for processing transactions based on product information entered by the operator.

The hybrid processing device 40 includes an MICR 130 for reading the MICR code 82, 92 from a check C (business check C1 or personal check C2); a check printer 120 for printing such information as the store information 84, 94 and amount information 95 to specified locations on the check C; a check scanner 140 for imaging the check C after it has been signed by the user; a photo ID scanner 110 (identity verification data acquisition means) for imaging the personal identification 71 presented by the user when the operator requests presentation of a driver license other personal identification 71; a receipt printer 150 for printing a receipt 36 based on the receipt print data sent from the POS terminal computer 30; a controller (CPU) 160 for controlling the parts of the hybrid processing device 40; a merge file generating means 170 for generating merged file f based on the check C image data acquired by the check scanner 140 and the data (identity verification data) for the personal identification 71 acquired by the photo ID scanner 110; and a merged file storage unit 180 for storing the merged file f produced by the merge file generating unit 170.

The controller 160 functions as a check type evaluation means to determine the type of check C based on whether or not the leading code 82a (see FIG. 4) is present in the MICR code 82, 92 read by the MICR 130. If the inserted check C is determined to be a personal checks C2 (because the leading code 82a is not detected), the controller 160 searches memory (such as RAM) storing the read history of the MICR 130 (if the MICR code 82, 92 and merged file f are stored as linked data), or searches the merged files f stored in merged file storage unit 180, to determine if the same user has used a check C before. If a merged file f for the same user is found, that merged file f is read from the merged file storage unit 180 and presented on the display 33 (display unit) of the POS terminal computer 30 as further described below.

Storing and reading merged files f generated in the past shall not be limited to using the merged file storage unit 180. For example, merged files f could be stored in a proprietary database 620 stored in the POS server 60, and this store database 620 could be searched to find and retrieve merged files f. This obviously reduces the memory requirements of the hybrid processing device 40.

The controller 160 drives the merge file generating unit 170 to execute a merge process producing the merged file f (see FIG. 9A, for example) by merging the image data g1, g2 for the check C captured by the check scanner 140, and the image data ga of the personal identification 71 captured by the photo ID scanner 110. The image data ga for the personal identification 71 is pasted into the image data g1 of the check back, and the image data g2 for the check face is then added to create the merged file f. This operation is described in further detail below.

The merged file f generated by the merge file generating unit 170 is then output to the POS terminal computer 30 (displayed on the display 33) as instructed by the POS terminal computer 30 or at the end of the merge process. The merged file f can also be printed by the receipt printer 150 as controlled by the POS terminal computer 30.

Figure 8:
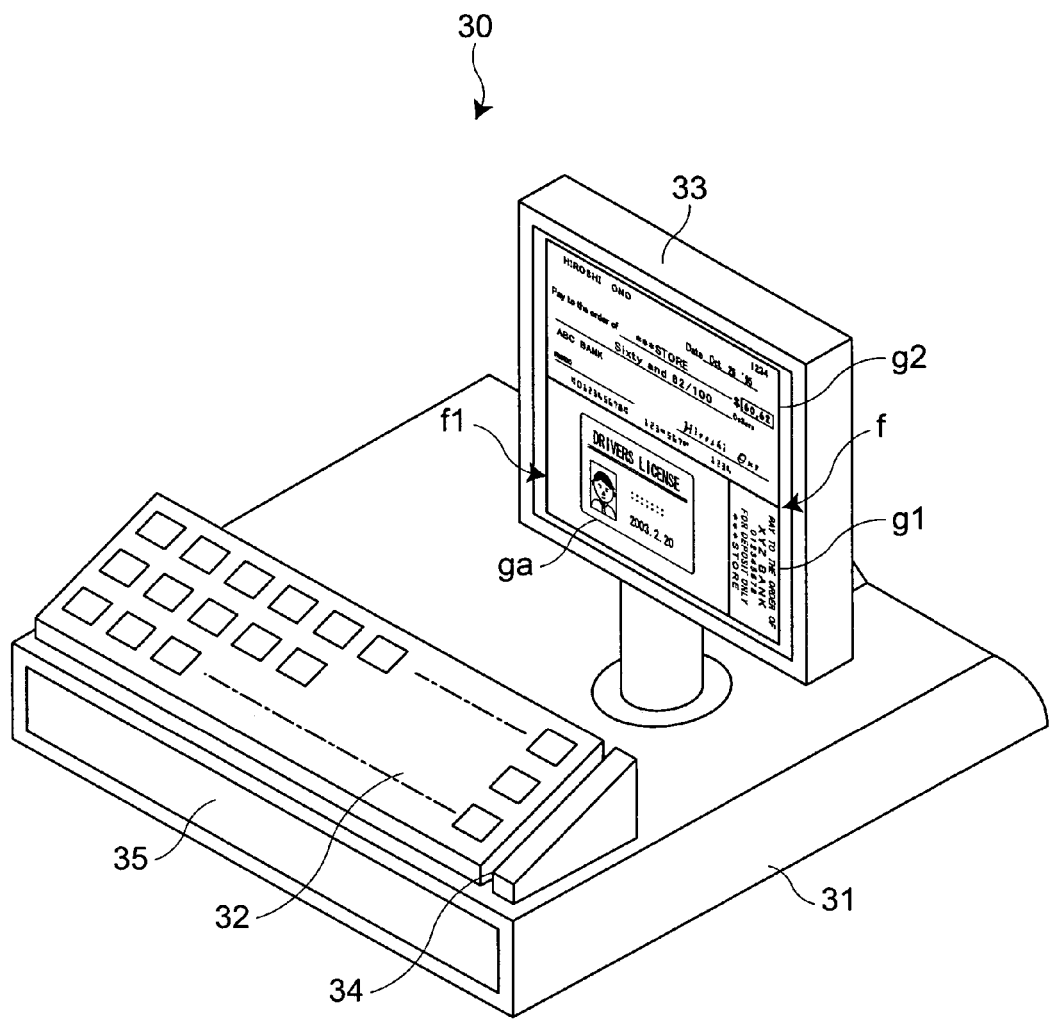
FIG. 8 shows how a merged file generated by the hybrid processing device of the present invention is output.

The POS terminal computer 30 has a keyboard 32 for entering product and amount information; a display 33 (see FIG. 8) for displaying the product and amount information, error messages, and the merged file f generated by the hybrid processing device 40; an MSR 34 for reading credit cards 76 (which are one means of payment); memory 320 such as ROM or RAM; and a controller (CPU) 310 for controlling the other parts of the POS terminal computer 30. The memory (memories) 320 stores a control program run by the controller, and control data including various data tables, in ROM, and uses a working area and various registers in RAM used as the working memory for the control processes.

If previously generated merged files f are stored in a store database 620, a buffer for storing the merged files f is also reserved in RAM for temporarily storing data sent from the hybrid processing device 40.

In addition to storing information relating to product codes and amount information, the POS server 60 has a controller (CPU) 610 for acquiring data stored temporarily in the memory 320 of POS terminal computer 30 and storing this data in the store database 620, managing the data in the store database 620, and controlling the POS server 60 and centrally controlling the multiple POS terminals 10 connected to the POS server 60. There is typically one POS server 60 per store (business), and the POS server 60 is maintained, checked, and managed by the store's POS server administrator. If the previously generated merged files f are stored in the POS server 60, the merged files f are preferably stored with links to the existing customer database (not shown) so that the merged files f can be used for customer management and as proof of a transaction in case of illicit usage.

Figure 7:
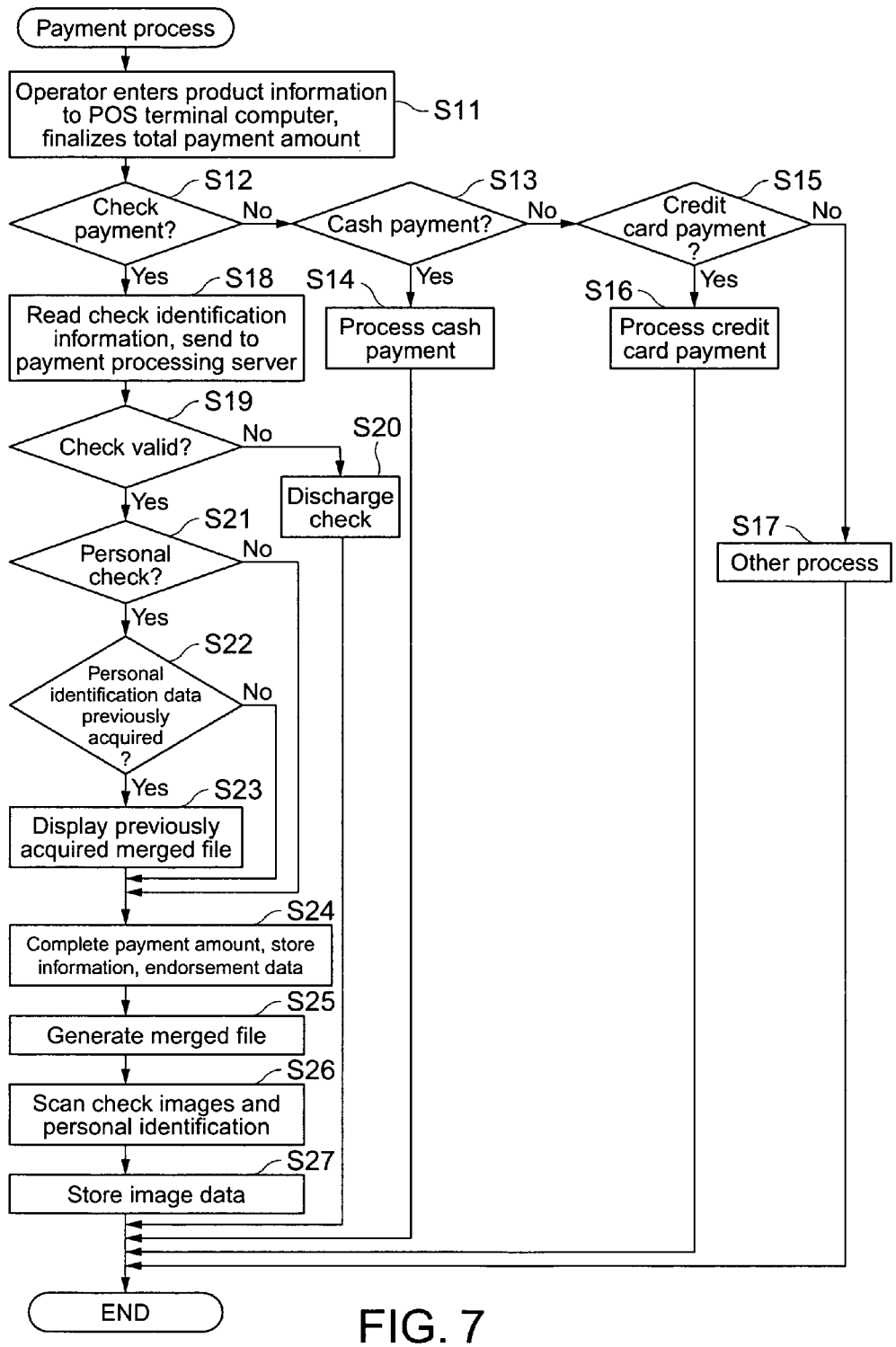
FIG. 7 is a flow chart of the check processing control method according to the present invention.

The check C payment process of the present invention is described next with reference to the flow chart in FIG. 7. When the transaction process runs and the payment amount is determined based on the product information entered by the operator to the POS terminal computer 30 (S11), whether the method of payment is a check or not is determined (S12). If a check is not used for payment (S12 returns no), whether payment is by cash is determined (S13). If payment is by cash (S13 returns yes), the payment is processed (S14) and operation ends.

If payment is not by cash (S13 returns no), whether payment is by credit card is determined (S15). If a credit card is used (S15 returns yes), the credit card is read by the MSR 34, the credit card payment is processed (S16), and operation ends.

If payment is not by check, cash, or credit card (S15 returns no), another process is run as controlled by the operator (S17).

However, if a check is used for payment (S12 returns yes), the operator has the customer (user) sign the check (signature 86, 96), and then inserts the signed check C to the insertion slot 43 of the hybrid processing device 40.

The hybrid processing device 40 then first drives the MICR 130 to read the MICR code 82, 92 (check identification information). The MICR code 82, 92 could also be read by optical character recognition (OCR) using the scanner 14 (check scanner 140). When the MICR code 82, 92 is read, the information is sent to the POS terminal computer 30, which forwards the information to the payment processing server 70 over network 65 (S18). Whether the check C is valid or not is then determined based on the response from the payment processing server 70 (S19).

If the check C is determined invalid (S19 returns no), the drive rollers 15a, 15b are reversed to discharge the check C from the insertion slot 43. An error is also indicated on the indicator unit 42 (see FIG. 2), and an error message saying that the check C is invalid is presented on the display 33 of the POS terminal computer 30.

If the check C is determined valid (S19 returns yes), whether the check C is a personal check C2 is determined based on the MICR code 82, 92 (S21). If the check C is a personal check C2 (S21 returns yes), whether an image of the user's (customer's) personal identification 71 was previously captured (that is, whether an merged file f for the user is stored) is determined (S22). If a previous merged file f is stored (S22 returns yes), that merged file f is presented on the display 33 (S23). The operator can then visually compare the picture on the display 33 with the user presenting the check C for the current payment, and if a clearly different person is presenting the check, the operator stops the payment process. If the user is the same person, the process continues. If the check C is not a personal check C2 (S21 returns no), or if the user (customer) is using a check C for the first time (that is, the user has no previous history) (S22 returns no), the operator can make no visual comparison and therefore continues the payment process.

The system then waits for the operator to enter the payment amount information 95. Once the amount 95 is entered, the check printer 120 prints the check C. More specifically, at least the amount 95 is printed by the front print head 12a to a predetermined location on the face of the check C, and the endorsement information 99 is printed to a predetermined location on the back of the check C by the endorsement print head 12b (S24).

When printing the amount information 95, store information 84, 94, and endorsement information 99 ends, the drive roller 17 is driven to image the back of the check C by means of the scanner 14 (check scanner 140). When imaging the endorsement side is completed, the check C is discharged from the paper exit 44. To image the front of the check C, the operator reinserts the check C to the insertion slot 43, this time with the back of the check facing up, and scans the front of the check C using the scanner 14 (check scanner 140). While the check C is being scanned, the operator requests personal identification 71 from the check user, and copies the personal identification 71 using the photo ID scanner 110 (S25).

When scanning the check C and personal identification 71 ends, the resulting image data g1, g2, ga is merged to generate the merged file f (S26). The merged file f is then stored to merged file storage unit 180 or store database 620 (S27), thus creating a record that can be used as evidence if the check was used illegally. The processed check C is then discharged from the paper exit 44, and can be stored or otherwise handled by the store as needed. If the check C is a business check C1, the payment amount (transfer amount) is entered to the POS terminal computer 30 as the amount information 95, but the amount handed to the user (customer) presenting the check is typically the amount of the check minus some amount such as a check cashing fee or perhaps the total of purchased goods.

Generating the merged file f is described next with reference to FIG. 9. In this example a personal check C2 is scanned and processed. The merged file f in the example shown in FIG. 9A includes an image of the check back as first image data g1, an image of the check front as second image data g2, and the image of the personal identification 71 captured by the photo ID scanner 110 pasted into the first image data g1. Described sequentially, the operator first inserts the check C with the face up to the hybrid processing device 40. The hybrid processing device 40 then reads the MICR code 82, 92 and prints the check C front and back, and then scans the back (endorsement side) of the check C using the check scanner 140 (see FIG. 3). The first image data g1 results from this imaging step. Depending on the timing at which the personal identification 71 is received from the customer, the photo ID scanner 110 images the personal identification 71 at the same time or after the check scanner 140 scans the check. The output of the photo ID scanner 110 is saved as personal identification image data ga.

When generating both the first image data g1 and personal identification image data ga is completed, the hybrid processing device 40 pastes the personal identification image data ga to remaining area E2 outside the endorsement printing area E1 to generate the first merged file f1.

The operator then inserts the check C with the back facing up, and the hybrid processing device 40 then scans the face of the check. The second image data g2 results from this scan, which is then merged with the previously generated first merged file f1. In this example the images are merged with the long sides aligned such as shown in FIG. 9A. The second image data g2 and first merged file f1 are thus merged, resulting in the second merged file f2 (i.e., merged file f).

Where in the remaining area E2 the image of the personal identification image data ga is pasted may vary according to the configuration of the scanner and differences in the size and design of the personal identification when generating the first merged file f1 if different types of identification (such as driver licenses, passports, and other photo ID cards) are accepted and scanned. A configuration enabling the operator to edit the merged file f as needed to, for example, change the size or paste location of the personal identification image data ga either when the first merged file f1 is generated or later is therefore preferable.

As thus described, image data g1 for the back of the check and personal identification image data ga (identity verification data) are thus first merged to create a first merged file f1, and this first merged file f1 is then merged with the image data g2 for the front of the check to produce the final second merged file f2. Therefore, when the check C is scanned one side at a time, and the check C and personal identification 71 are scanned and imaged by different scanners 140, 110, a merged file f can be quickly generated, that is, generating the merged file f does not need to wait until both sides of the check have been imaged. The operator can therefore confirm that the merged file f has been created without making the customer (check user) wait, and a drop in job efficiency is thus prevented. Furthermore, the image merging process is also simplified because two check images g1 and g2, and the personal identification image data ga, (that is, three images) are not merged at the same time.

Furthermore, because the first merged file f1 is created by pasting the personal identification image data ga into the remaining area E2 outside the endorsement printing area E1 in the image data g1 for the back of the check, the readability of the endorsement is not impaired by inserting the personal identification image data ga.

In addition, because the first merged file f1 and the image data g2 for the other side of the check are the same size, the first merged file f1 and image data g2 can be easily matched and merged, and the resulting second merged file f2 is easier to read when seen on screen.

The operator can also confirm the image data g1, g2 for both sides of the check and the personal identification image data ga at the same time in a single screen because the second merged file f2 is displayed so that the entire image can be seen on the display 33 without the operator needing to scroll or move the image (because the image size, display ratio, and other display parameters are appropriately set).

Generating the merged file f shall not be limited to the foregoing procedure as the scanning sequence of the image data g1, g2 for the front and back sides of the check C, and the method of merging the image data g1, g2, and ga, can be varied in many ways as desired. For example, the images can be scanned sequentially in any order, or even simultaneously (front and back scanned at the same time).

Figure 9A:
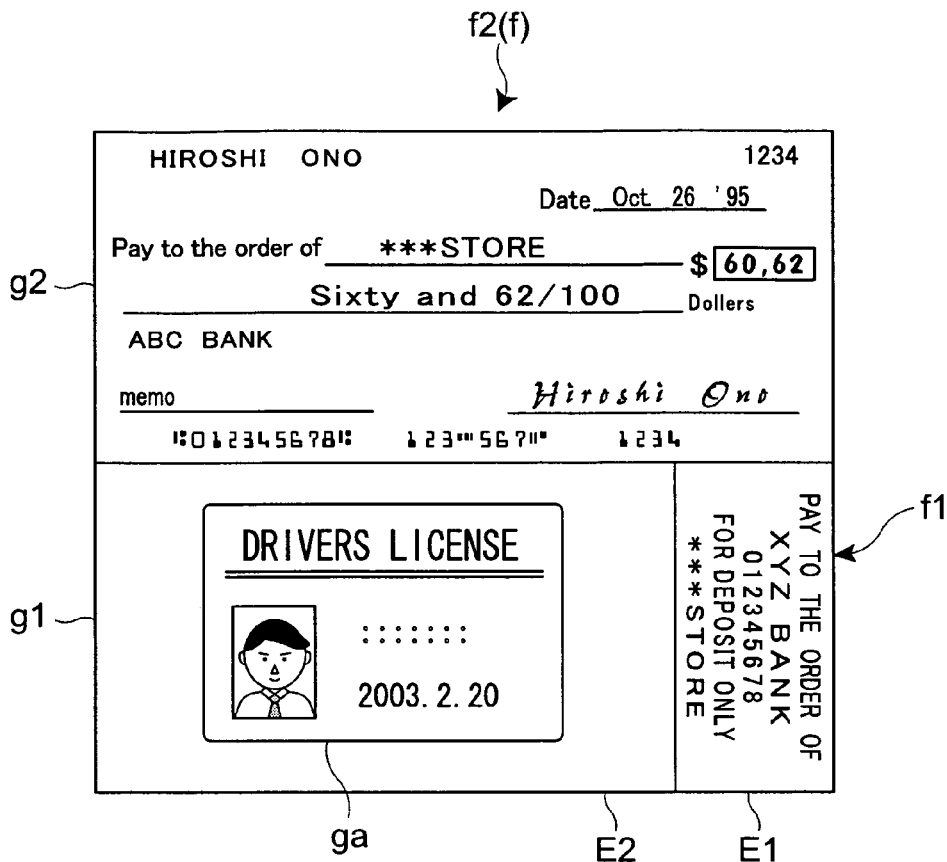
FIGS. 9A and 9B show examples of the merged files generated by the hybrid processing device of the present invention.
Figure 9B:
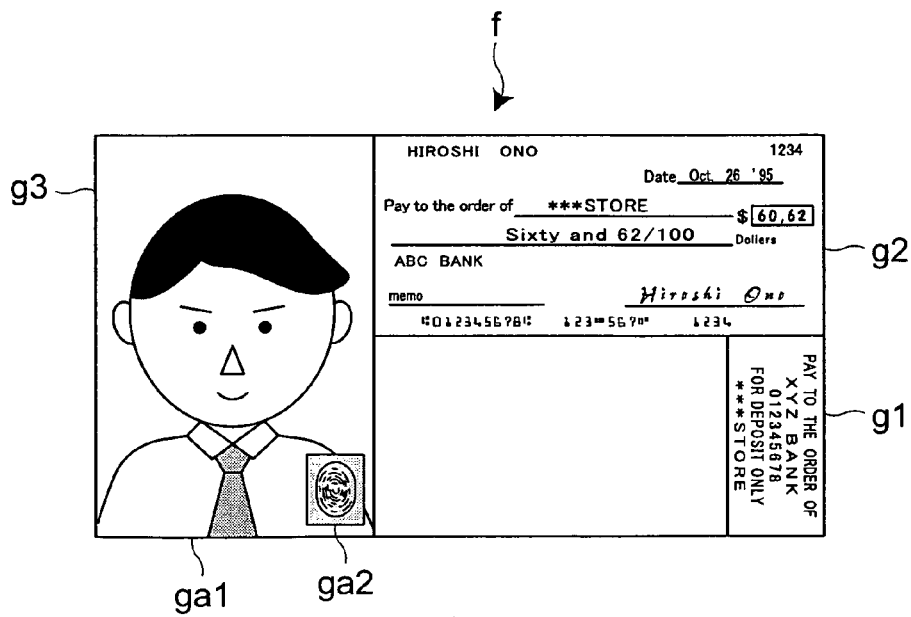

Third image data g3 as shown in FIG. 9B, for example, could be used instead of personal identification image data ga. This third image data g3 has a fingerprint image ga2, which is a scan of the user's fingerprint, pasted into a facial picture ga1 of the user (such as just the user's photograph captured from the personal identification) in the lower right corner (or other area not covering the face). The first image data g1, second image data g2, and this third image data g3 are then merged at the same time to create the merged file f.

By thus creating the merged file f using two pieces of personal identification, specifically, facial picture ga1 and fingerprint image ga2, the merged file f is even more effective as a transaction record that could be used as evidence of a crime.

Furthermore, because the facial picture ga1 can be displayed large on the screen, visual comparison by the operator is even easier.

A second embodiment of the present invention is described next with reference to FIG. 10. Personal identification data is acquired (by scanning personal identification 71 in the foregoing embodiment) for all check users in the first embodiment. This embodiment of the invention acquires the identity verification data only when the check C meets certain conditions (such as when a check C that might result in a large loss is used) based on the result of reading the MICR code 82, 92 and/or the payment amount. The benefit of this configuration is that a record that could be used as criminal evidence is saved for checks C that are considered high risk without lowering overall job efficiency. Some form of personal identification 71 is used as the identity verification data as in the first embodiment. This second embodiment is described below with particular attention to the differences from the first embodiment.

Figure 10:
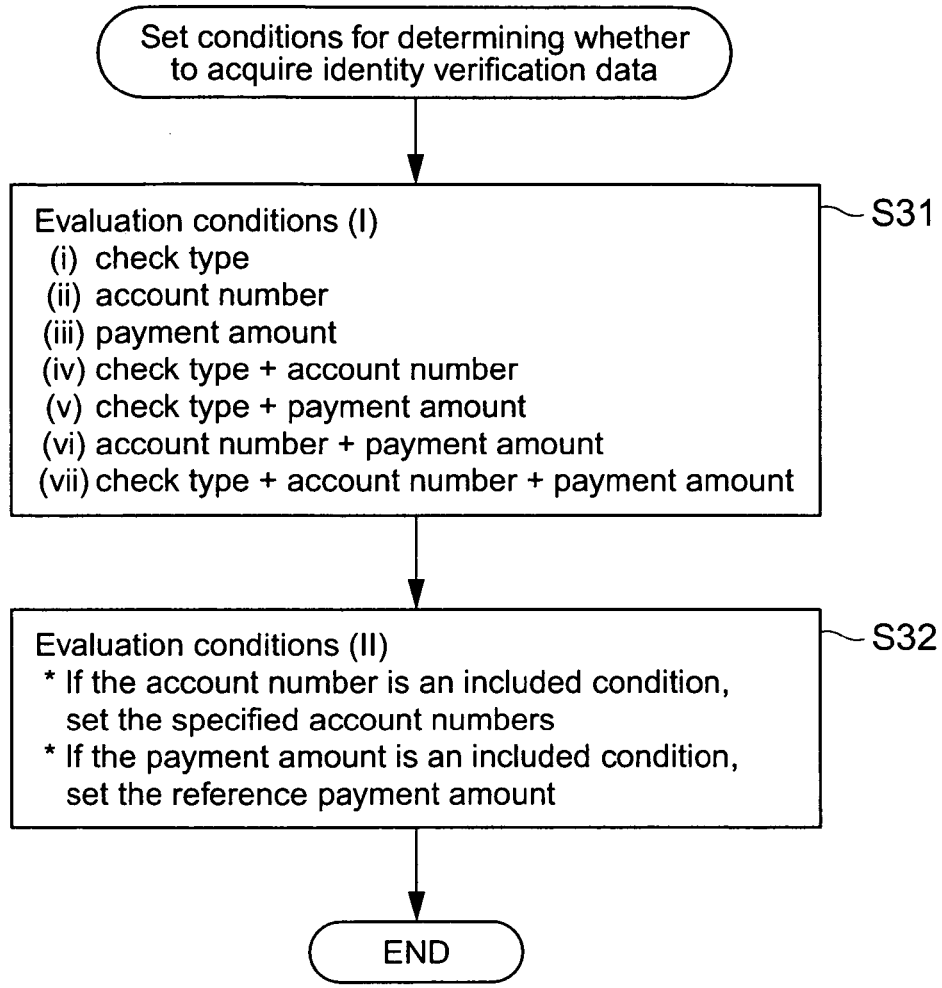
FIG. 10 is a flow chart showing part of the check processing control method according to a second embodiment of the present invention.
Figure 11:
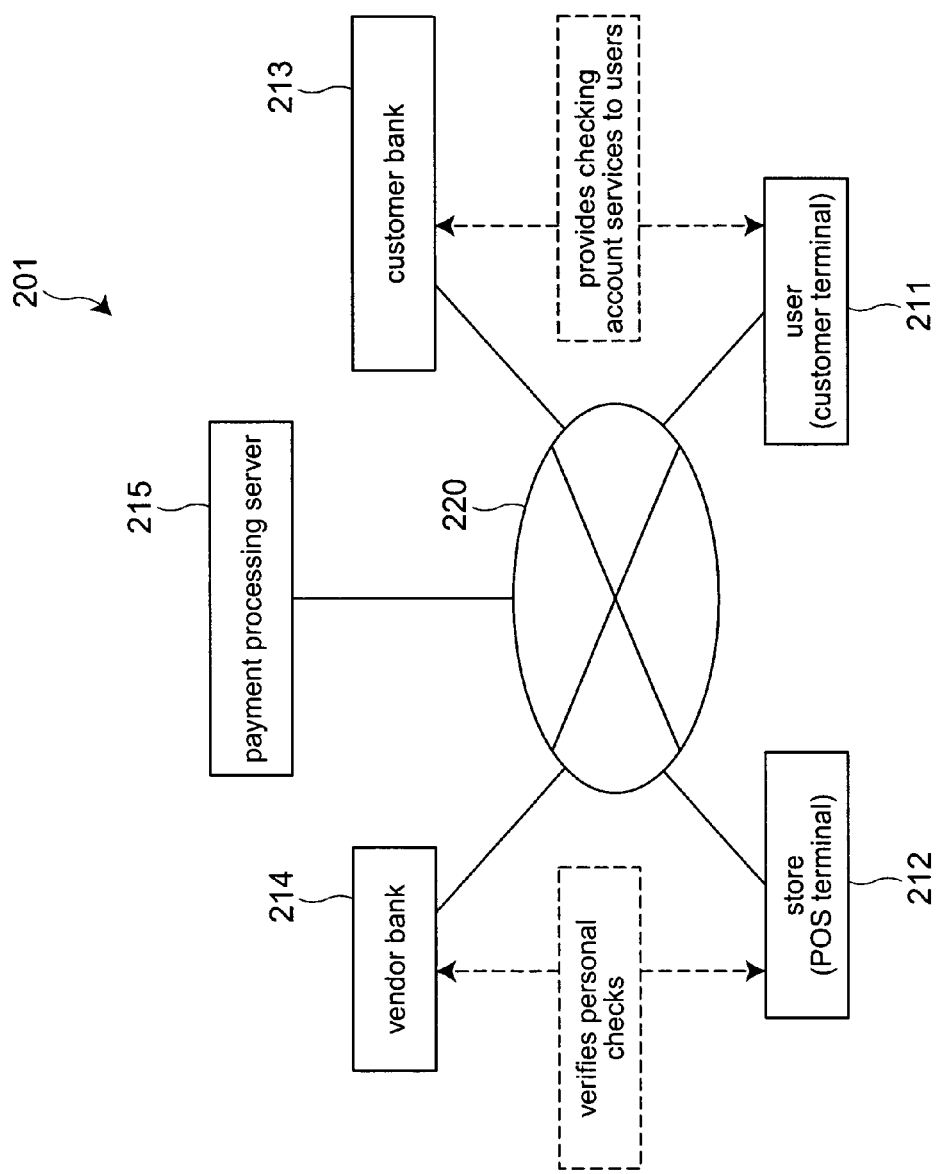
FIG. 11 shows the configuration of an electronic payment system according to the prior art.

As shown under Evaluation Conditions (I) in FIG. 10, the hybrid processing device 40 determines whether to scan personal identification 71 based on the information read from the MICR code 82, 92 (the (i) check type and (ii) account number detected by character recognition) and/or payment information ((iii) payment amount) entered from the keyboard 32. The conditions for evaluating the MICR code 82, 92 are preset by the operator, for example, and are used for decision making. If the decision is to scan, a prompt instructing the operator to scan the customer's personal identification 71 is presented on the display 33 and indicator unit 42 (see FIG. 1), and the identification is then scanned by the photo ID scanner 110. If the decision is to not scan the personal identification 71, operation continues to the next step, such as imaging the check C using the check scanner 140.

A method of setting the rules (conditions) used to evaluate the MICR code 82, 92 is described below. As shown in FIG. 10 (step S31), seven conditions (i) to (vii) are defined as conditions (I), that is: (i) check type, (ii) account number, (iii) payment amount, (iv) check type+account number, (v) check type+payment amount, (vi) account number+payment amount, and (vii) check type+account number+payment amount. Note that "+" here (conditions iv to viii) indicates a logical AND, and requires that all conditions are true.

The check type is determined by reading the MICR code 82, 92 (more specifically whether the leading code 82a (Auxiliary On-Us field) is present, and is used to determine that the check C being scanned is a business check C1 (see FIG. 4A). The account number is the account number read from the MICR code 82, 92, and is used to check for a match with a specified account number previously flagged as being a high risk account.

The payment amount is the payment amount acquired from the amount information sent from the POS terminal computer 30 (the amount entered from the keyboard 32 or in the print data to be printed by the receipt printer 150), and is used to determine if the check is for an amount greater than a predetermined reference amount.

Applying condition (vii) (check type AND account number AND payment amount) therefore means that the check C is a business check C1, the account number matches a specified account number, and the payment amount is greater than or equal to a reference amount, and the personal identification 71 is scanned only if all of these conditions are true.

Which if these conditions (I) is used can be controlled using the keyboard 32 of the POS terminal computer 30.

After conditions (I) are set, conditions (II) are set (S32). If the account number is one of the conditions, the specified account numbers must be set. If the payment amount is one of the conditions, the reference amount used for comparison must be set. These conditions are also set using the keyboard 32 of the POS terminal computer 30.

These conditions could obviously be set without using the keyboard 32 of the POS terminal computer 30 by providing control buttons on the hybrid processing device 40 for setting any of the conditions. It is assumed in this case that the specified account numbers and the reference amount assumed preset in step S32 were previously entered using the keyboard 32 of the POS terminal computer 30.

Furthermore, rather than the operator of the POS terminal computer 30 setting these conditions from the keyboard 32, the relevant information could be acquired and set over a network 65 from the POS server 60 or payment processing server 70, for example. In stores having multiple POS terminals 10, this configuration assures that every POS terminal 10 can quickly acquire the same data and evaluate the MICR code 82, 92 according to the same conditions.

Furthermore, the account number is used in the above conditions to check for a match with a predefined list of account numbers, but could instead be used to check that the customer's check number does not match the list of specified account numbers. More specifically, this condition can be set to detect account numbers that are considered low risk.

If none of these conditions is applied, personal identification 71 is scanned for all users presenting a check C. Obviously, however, the procedure could be defined so that personal identification 71 is not scanned for any user presenting a check C.

Rather than acquiring identity verification data for all users, this embodiment of the invention enables selectively scanning personal identification 71 based on the check identification information and payment amount, for example. By thus imaging identification only when the check could result in a large loss (such as with payroll checks used to pay salaries), or the check amount is large, evidence relating to high risk checks can be efficiently collected and saved without lowering overall job efficiency.

Furthermore, because the format of the merged file f that is saved is the same regardless of whether identity verification data is collected, differing only in whether personal identification image data ga is included in the remaining area E2 of the image) (see FIG. 9A), the merged file f is easy to read on the display 33.

Furthermore, because personal identification 71 is imaged when the check type is one of the conditions and the check C is determined to be a business check C1, the financial loss can be minimized in the event the business check C1 was used illegally. When a personal check C2 is used, the payment amount is usually equal to the amount of the purchased goods, and the loss is therefore relatively small. Because business checks C1 are used to pay salaries, however, the amounts, and therefore potential loss, are relatively large.

Furthermore, because the account information contained in the MICR code 82, 92 is used when the account number is one of the conditions, the account number can also be used to assure that personal identification 71 is scanned when the check is drawn on the account of a business that is considered financially risky, for example. If the payment amount is then also included as a condition, personal identification 71 is also scanned if the payment amount exceeds the set threshold amount. Therefore, if the check is used illegally, a record and evidence of a crime is left when the amount is large.

Furthermore, because an operator of the POS terminal 10 can set and change the account numbers and reference amount, the rules can be easily adjusted to the needs of the store (the store location, current conditions, and other conditions defined by the store).

The evaluation rules are preset in the foregoing embodiment, but one or more of the check type, account number, and payment amount conditions can be preset and stored in the hybrid processing device 40 or POS terminal computer 30. This eliminates the need for the operator to set these conditions.

The personal identification 71 is imaged conditionally in this embodiment according to the predefined evaluation rules and the acquired check identification information 82, 92, but the operator could ignore these conditions and information and make all decisions regarding whether to image the personal identification 71. That is, if the operator determines that the customer's personal identification 71 should be imaged and saved, the operator could insert the personal identification 71 for scanning after the product information was entered from the keyboard 32 or the check scanner 140 was scanned and before the receipt is output. This configuration simplifies the control program because the decision-making process can be skipped, and the cost of the hybrid processing device 40 and POS terminal computer 30 can therefore be reduced.

The check type, account number, and payment amount are used as the conditions in this embodiment, but these could be supplemented or replaced by other conditions according to the store's needs.

Furthermore, the evaluation of the MICR code 82, 92 and/or payment amount, and the decision whether to image the personal identification 71, are processed in the hybrid processing device 40 in this embodiment, but these operations could be done by the controller 310 in the POS terminal computer 30.

As described above, a check processing apparatus and program, electronic payment system, and check processing method according to the present invention acquires identity verification data (that is, images the customer's personal identification 71) used to confirm the identity of a person using a check C when a check is used as the means of payment, and the captured data can be used for criminal evidence when a check is used illegally (such as in check forgery).

Furthermore, the identity verification data acquired by imaging the person's identification (personal identification image data ga), and the image data g1, g2 of the check, are not stored (output) separately or in linked records, but instead in a single merged file f. The operator can therefore quickly and easily verify the image data g1, g2 and the personal identification image data ga.

Furthermore, because data linking the image data g1, g2 and the identity verification data (personal identification image data ga) is not needed, the data structure is simplified and the required storage space can be minimized.

Furthermore, because the merged file f is created by merging image data g1, g2 from both sides of the check with the identity verification data (personal identification image data ga), more detailed, accurate image data can be saved when compared with saving only the image data g2 for the check front.

Furthermore, if an error was made on either side of the check, the merged file f can be easily retrieved later for reference.

If the check C is a personal check C2, an individual user can be identified from the account number information in the MICR code (check identification information) 82, 92. In addition, when the same person uses another check C on the same POS system 1, the previous merged file f can be presented on the display 33. The operator can then easily compare the current user with the face of the person displayed on screen to confirm if they are the same person. In other words, illicit check C usage can be prevented more dependably.

It should be noted that the check processing method of this invention is realized by connecting the hybrid processing device 40 to the POS terminal computer 30 in the foregoing embodiments, but the functions of this hybrid processing device 40 could obviously be assembled in a single unit (in POS terminal computer 30). Thus configured, the entire sequence from product information entry to check processing, receipt 36 printing, and personal identification 71 scanning can be executed using a single POS terminal computer, thus eliminating the need to connect the hybrid processing device 40 to the POS terminal computer 30, as well as the need to install and configure a driver in order to connect the hybrid processing device 40. Assembly within a single unit also reduces the required installation space, and makes delivery and setup easier.

The functions (means) of the hybrid processing device 40 and POS terminal computer 30 described in the first and second embodiments above can be rendered in a computer-executable program.

This program can also be recorded on a storage medium not shown, and installed in a personal computer, for example, and the check processing method of the invention is therefore not limited to implementation in a POS system 1.

Usable storage media include flash memory, memory cards (including (Compact Flash (R)), Smart Media, memory sticks), Compact Discs, DVDs, magneto-optical discs, and floppy disks.

Furthermore, imaging a driver license is used by way of example as acquiring identity verification data above, but the invention shall not be so limited and other types of personal identification could be used, including passports, ID cards, and even ATM cards. The identity verification data could also be acquired by reading (using character recognition) specific information recorded on the personal identification 71.

This identity verification data is further not limited to personal identification 71, and biometric data could also be used. Various types of biometric data could be collected in addition to or instead of the face and fingerprint shown in FIG. 9B, including a hand print (length and thickness of the fingers, size of the hand itself), a retina scan (pattern of blood vessels in the eye), an iris scan, blood vessel pattern (vein pattern), or other biometric data. Information that cannot be directly captured as an image can also be used as identity verification data, including, for example, a voice print, a dynamic signature (the shape and time pattern for writing a signature), or a keystroke pattern (key entry timing). If such non-visual data is used, an image of the data (such as an image of the sound wave derived from the identity verification data acquired by recording the voice of the check user to acquire a voice print).

The merged file f is also output in the foregoing embodiments by presenting the merged file f on the display 33 of the POS terminal computer 30, but the merged file f could also be printed using the receipt printer 150 or using a separate dedicated printer for outputting the merged files.

If printed using the receipt printer 150, the check image data g1, g2 shown in FIG. 9A is preferably merged horizontally, that is, with the short sides aligned. This prevents the merged file f from becoming unreadable even when printing on a long strip of roll paper such as used for sales receipts.

Furthermore, the payment processing server 70 determines the validity of the check C based on the check identification information 82, 92 above, but check C validity could be determined based on the merged file f containing the identity verification data (personal identification image data ga). This enables more accurate, reliable verification of check C validity. If the payment processing server 70 determines check validity based on the merged files, however, identity verification data for a large number of people must be prestored in the payment processing server 70. If fingerprints are used as the identity verification data, for example, everyone in the country (or everyone using a check) must be required to provide a fingerprint, and the payment processing server 70 must have access to fingerprint image data for everyone in the country. Then, when a merged file f is sent from a POS terminal 10 via network 65, a computer handles the validation. Check C validity can thus be determined based on an objective constant standard, and reliability can be improved.

It will also be obvious to one with ordinary skill in the related art that the present invention shall not be limited to the system configuration and device configurations described above, and can be varied in many ways without departing from the scope of the accompanying claims.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A check processing apparatus for processing payments by check, comprising:
a check image scanning unit for generating check image data of all or part of a check during a check transaction;
an identity verification information acquisition unit for capturing identity verification information from an identification item used to identify an individual using the check and provided by said individual during said check transaction;
an identity verification data generating unit for generating identity verification image data of the captured identity verification information;
a merge file generating unit for merging the check image data with the identity verification image data to generate an identification merged file;
a merged file storage unit for storing the identification merged file;
a merged file output unit for outputting the identification merged file;
a payment amount evaluation unit for determining if the payment amount of the check is greater than or equal to a specified fixed minimum amount previously set within said apparatus; and
an identity verification data acquisition control unit for determining to acquire identity verification data if the payment amount evaluation unit determines that the payment amount is at least said fixed minimum amount, and to not acquire identify verification data if the payment amount evaluation unit determines that the payment amount does not exceed said fixed minimum amount;
wherein the identity verification information acquisition unit captures identity verification information based on the decision of the identity verification data acquisition control unit; and
wherein said apparatus continues to process the payment by check irrespective of whether said payment amount exceeds or does not exceed said fixed minimum amount.

2. The apparatus of claim 1, wherein the check image scanning unit scans and images both sides of the check; and
the merge file generating unit generates the identification merged file by merging image data of both sides of the check with the identity verification image data.

3. The apparatus of claim 2, wherein the merge file generating unit produces a first merged file by merging the identity verification image data with image data for a complete image of one side of the check, and produces a second merged file by merging the first merged file with the image data for a complete image of a second side of the check; and
the merged file storage unit stores the second merged file within said apparatus as said identification merge file.

4. The apparatus of claim 3, wherein the first merge file generating unit produces the first merged file by superimposing the identity verification image data into an area outside an endorsement printing area in the image data of the back of the check.

5. The apparatus of claim 3, wherein the merged file output unit displays the second merged file on a display; and
the second merged file is displayed so that the entire image is viewable on the display at the same time without a need for scrolling or moving the displayed content.

6. The apparatus of claim 1, further comprising:
a check identification information reader for reading check identification information preprinted on the check;
a check type detection unit for determining if the check is a personal check based on the read check identification information; and
an identity verification data acquisition detection unit for determining, when the check is determined to be a personal check, if identity verification data for a previous check user associated with the read check identification information was acquired in the past and used in the creation of a previous identification merged file;

wherein the merged file output unit outputs the previous identification merged file when the identity verification data acquisition detection unit determines that identity verification data for the previous check user was acquired in the past.

7. The apparatus of claim 6, wherein said previous identification merged file is stored within said apparatus.

8. The apparatus of claim 6, wherein if said merged file displays the previous identification merged file, then the check image scanning unit does not generate a new check image data and the identity verification data generating unit to generate does not generate new identity verification image data.

9. The apparatus of claim 1, wherein said identification item is a personal identification document of said individual or information items recorded on said personal identification document.

10. The apparatus of claim 1, wherein said identification item is biometric data of said individual.

11. A computer-readable program for achieving the operation of the apparatus of claim 1.

12. An electronic payment system comprising a check processing apparatus of claim 1, and a payment processing server connected to the check processing apparatus through a network for determining check validity;
wherein the payment processing server determines check validity based on information on said identification merged file sent from the check processing apparatus.

13. The Check processing apparatus of claim 1, wherein said check image scanning unit generates an image of a personal endorsement area of said check.

14. The apparatus of claim 1, further comprising:
a payment amount evaluation unit for:
determining if the payment amount of the check is not lower than a specified fixed minimum amount previously set within said apparatus; and
if said payment is not lower than said specified fixed minimum amount, then permitting the check transaction to continue without the identity verification information acquisition unit capturing identity verification information, and without the identity verification data generating unit generating said identity verification image data; and without the merge file generating unit merging check image data with identity verification data.

15. The apparatus of claim 1, wherein said identification item is a photo ID document of said individual, and the generated identity verification image data is a an image of the photo on said photo ID.

16. The apparatus of claim 1, further comprising:
a specific information detection unit for determining if specific information is contained in the check identification information;
an identity verification data acquisition control unit for determining whether to acquire identity verification data according to the decision made by the specific information detection unit.

17. The apparatus of claim 1, wherein:
said identification item is a personal identification document of said individual; and
said identity verification information acquisition unit image scans said personal identification document to create said captured identity verification information.

18. A check processing method, comprising a processing device implementing the steps of:
(a) imaging all or part of a check presented by a person using the check during a check transaction;

(b) capturing identity verification information from an identification item used to identify the person using the check and provided by said person during said check transaction;

(c) generating identity verification data as an image of the captured identity verification information;

(d) merging the image data captured in step (a) and the identity verification data to generate an identification merged file; and (e) outputting the identification merged file;

wherein steps (a) through (e) are implemented internally by said processing device.

19. The method of claim 18, wherein:
step (a) scans and images both sides of the check; and
step (d) merges the image data of both sides of the check with the identity verification data.

20. The method of claim 19, wherein step (d) includes:
(d1) producing a first merged file by merging the identity verification data with image data of a complete image of one side of the check, and
(d2) producing a second merged file by merging the first merged file with image data of a complete image of a second side of the check.

21. The method of claim 20, wherein step (d1) produces the first merged file by superimposing the identity verification data onto an area outside an endorsement printing area in the image data of the back of the check.

22. The method of claim 20, wherein step (e) outputs the second merged file as said identification merged file so that the image of the identification merged file is viewable in its entirety on a display.

23. The method of claim 18, further comprising:
(f) reading check identification information preprinted on the check;
(g) determining if the check is a personal check based on the read check identification information; and
(h) determining, when the check is determined to be a personal check, if identity verification data for a previous check user associated with read check identification information was acquired in the past and used in the creation of a previous identification merged file;
wherein step (e) outputs the previous identification merged file when step (h) determines that identity verification data for the previous check user was acquired in the past.

24. The method of claim 18, further comprising:
(j) determining if the payment amount of the check is greater than or equal to a specified fixed minimum amount set within said processing device; and
(k) acquiring identity verification data if step (j) determines that said the payment amount is at least said specified fixed minimum amount, and proceeding with the processing of the check without acquiring identity verification data if step (j) determines that the payment amount does not exceed said specified fixed minimum amount;
wherein step (b) captures identity verification information based on the decision of step (k).

25. The method of claim 18, wherein said identification item is a personal identification document of the person using the check or information items recorded on the personal identification document.

26. The method of claim 18, wherein said identification item is biometric data of the user.

27. The method of claim 18, further comprising:
(i) determining if specific information is contained in the check identification information;
(k) determining whether to acquire identity verification data according to the decision made by step (i);
wherein step (b) captures identity verification information based on the decision of step (i).

28. The method of claim 18, wherein said identification item is a personal identification document of the person using the check, and step (b) captures said identity verification information by image scanning said personal identification document.

* * * * *

UNITED STATES PATENT AND TRADEMARK OFFICE
CERTIFICATE OF CORRECTION

| | |
|---|---|
| PATENT NO. | : 7,644,043 B2 |
| APPLICATION NO. | : 10/911431 |
| DATED | : January 5, 2010 |
| INVENTOR(S) | : Masahiro Minowa |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Sixteenth Day of November, 2010

David J. Kappos
*Director of the United States Patent and Trademark Office*